No. 834,978.
PATENTED NOV. 6, 1906.
J. J. HASSEN.
STEAM TRAP.
APPLICATION FILED FEB. 27, 1906.
2 SHEETS—SHEET 2.
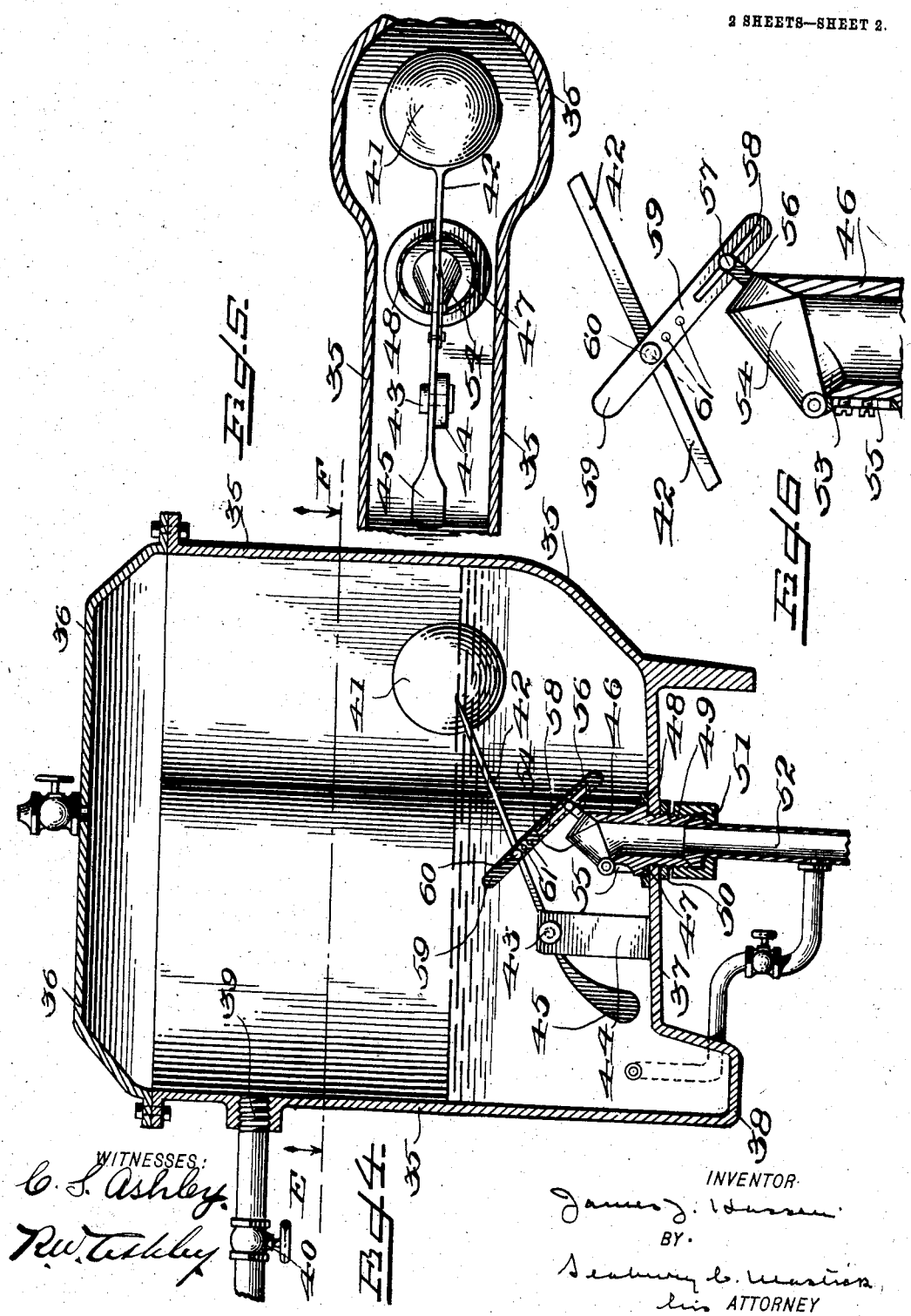
WITNESSES:
INVENTOR
BY
ATTORNEY

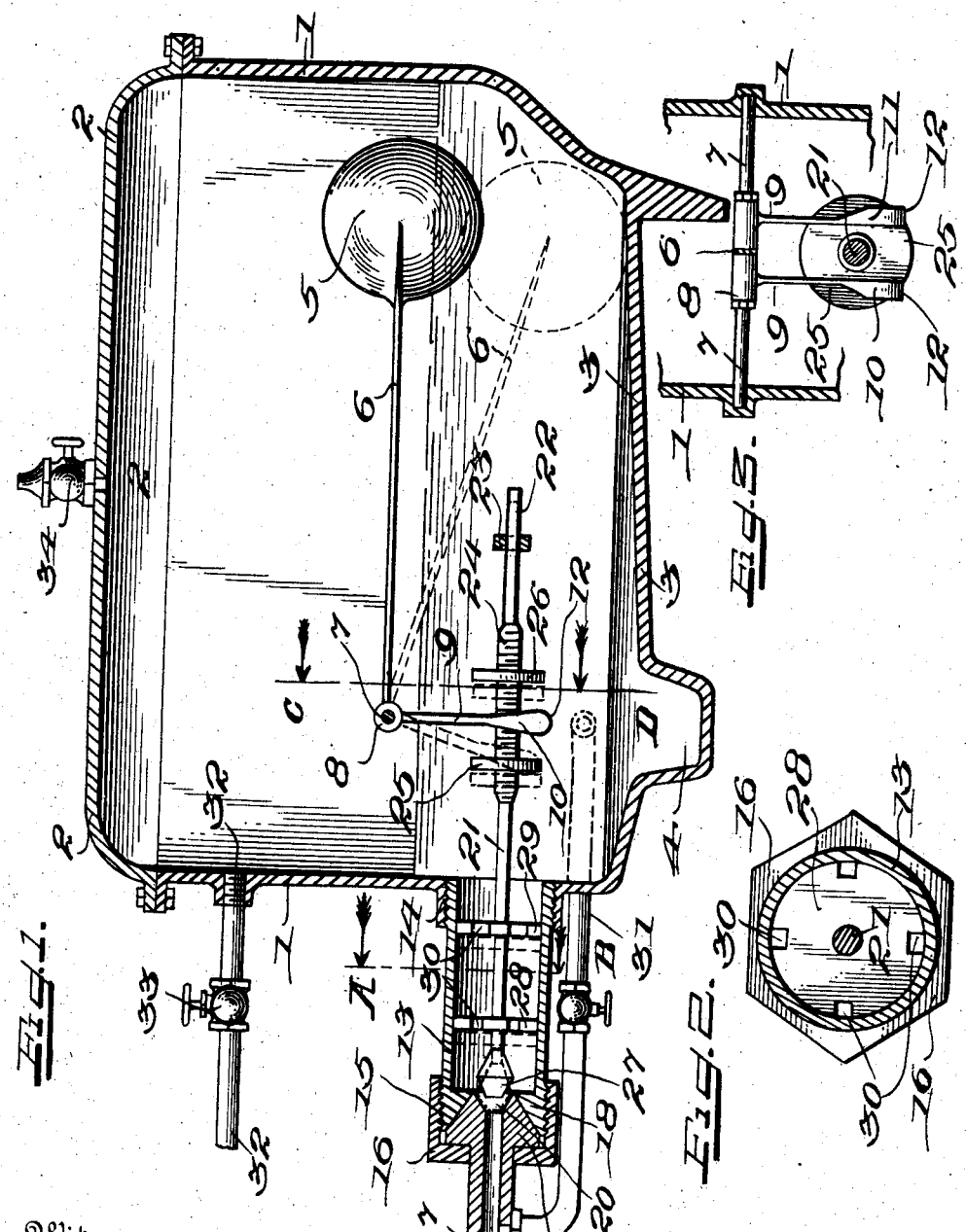

UNITED STATES PATENT OFFICE.

JAMES J. HASSEN, OF NEW YORK, N. Y.

STEAM-TRAP.

No. 834,978.            Specification of Letters Patent.            Patented Nov. 6, 1906.

Application filed February 27, 1906. Serial No. 303,221.

*To all whom it may concern:*

Be it known that I, JAMES J. HASSEN, a citizen of the United States, residing in the city of New York, county of New York, State of New York, have invented certain new and useful Improvements in Steam-Traps, of which the following is a specification.

My invention relates to improvements in steam-traps, particularly that type adapted to be used for regulating and controlling the discharge of water of condensation from steam-heating systems, &c., and has as its object the providing of means for the rapid and even discharge of water therefrom, and means for starting the discharge of water from said trap, means for adjusting said water-discharging means, and means for increasing and decreasing the amount of water discharged from said trap.

Another object of my invention is that the apparatus as above described consists of so small a number of parts that it may be easily dissembled or assembled, cleaned, and repaired and that in replacing any of the parts thereof the user or artisan need not hold the trap out of commission for any great length of time, as the parts whereon the water has the greatest action are so simple that they require very little alteration to be replaced.

In the following I have described, in connection with the accompanying drawings, one embodiment of my invention, the features thereof being more particularly pointed out hereinafter in the claims.

In the drawings, Figure 1 is a longitudinal sectional view illustrating one form of my invention. Fig. 2 is an enlarged detailed cross-sectional view on the line A B of Fig. 1. Fig. 3 is a detail cross-sectional view on the line C D of Fig. 1. Fig. 4 is a vertical sectional view of a modified form of construction, illustrating my invention as applied to a vertically-thrusting discharge-controlling valve. Fig. 5 is a longitudinal sectional view on the line E F of Fig. 4, and Fig. 6 is an enlarged detail view of the valve-operating parts as shown in Fig. 4.

Similar numerals of reference indicate similar parts throughout the several views.

1 indicates a casing or reservoir provided with a suitable cover 2, said cover 2 being adapted to be fastened thereto by bolts or any other suitable means. The bottom or floor 3 of said casing slopes downwardly toward the discharge end of the casing and has formed therein a channel 4, said channel being adapted to collect the mud and sediment washed into said trap by the action of the water-feed.

5 is a ball-float having an arm 6 pivotally mounted on a cross-shaft 7, fixed in the side walls of the trap-casing 1. Rigidly fastened to the enlarged collar 8 of the arm 6 a forked arm 9 is provided, said forked arm having two leg members 10 and 11, each of said members being adapted to be rounded at their lower ends, as at 12, to permit of the free movement of said members on the adjusting-disks, the object of said disks being hereinafter described.

The discharge means comprises a pipe connection 13, adapted to be screwed into a nipple-lug 14, formed on the face-casting of the casing 1, said pipe connection 13 on its outer end being screw-threaded, as at 15, to receive coupling-nut 16 of the discharge-pipe connection 17. The pipe connection 13 at its outer end has formed on the inner periphery thereof a circular lug 18, adapted to form a seat for the tapered nut or head 19 of the discharge-pipe, said tapered nut 19 having formed therein a valve-seat 20.

21 is a rod interposed in said pipe connection 13, extending longitudinally thereof into the trap-casing 1 and provided at its inner end, as at 22, with a smooth bearing-surface slidably mounted in a bearing 23, said bearing being in turn mounted in the sides of the casing 1. The object of said bearing 23 is to provide a means to prevent the vertical or side motion of the rod 21 when the valve-rod is operated. Rod 21 has formed thereon an enlarged threaded portion 24, adapted to receive adjusting-disks 25 and 26, the object of said adjusting-disks being to regulate the throw of the forked arm 9 and to increase and decrease the amount of water discharged by the discharging means.

27 is a valve-head mounted on the extreme outer end of the rod 21, adapted to open and close the passage in discharge-pipe connection 17.

28 and 29 are disks mounted on rod 21 and adapted to assist the main force or action of the discharge means, said disks also acting as bearings for said rod 21. The object of passage-ways 30, cut on the outer periphery of said buffer-disks, is to provide a cutting or agitating means in case sediment should collect in the discharge-pipe connection 13, said disks being adapted to slide longitudinally thereof in pipe connection 13. Said bearings or buffer-disks 28 and 29 have on their outer periphery passage-ways 30, adapted to allow a free passage of water therethrough on the opening of the discharge-valve.

31 is a by-pass connecting the trap 1 with the discharge-pipe connection 17. The object of said by-pass is to provide a means for assisting the discharge of water from the reservoir.

32 is a steam-inlet pipe provided with a controlling-valve 33.

34 is a draw-off petcock mounted in a cover 2, adapted to draw off the surplus air in the trap.

Fig. 4 of the drawings is a modified form of construction illustrating a vertically-operating controlling-valve as applied to a trap of the class described.

35 indicates the casing or reservoir, provided with a suitable cover 36, said casing 35 having a sloping bottom 37. 38 is a channel formed in the bottom thereof directly beneath the inlet 39, said inlet being provided with a controlling-valve 40. The object of said channel 38 is as above described.

41 is a ball-float provided with an arm 42, pivotally mounted, as at 43, on lug 44, said lug 44 being cast with the casing 35. Arm 42 at the pivotal end thereof has an enlarged weighted portion 45, adapted to partly balance the discharge-controlling means.

The discharge-valve in Fig. 4 comprises a vertically-mounted valve-casing 46, having formed on its central portion a hexagonal lug 47, adapted to rest on bottom 37 and engage a correspondingly-shaped lug portion 43, cast with the bottom of said trap-casing 35. Valve-casing 46 is threaded, as at 49, to receive jam-nut 50 at one portion thereof and at its extreme lower end a coupling-nut 51 on the discharge-pipe connection 52. Valve-casing 46 at its upper end or mouth portion 53 thereof is constructed so as to form a valve-seat for valve-cap 54. Said valve-cap 54 is adapted to be hinged to valve-casing 46, as indicated at 55, and has means mounted thereon for the vertical adjustment of said valve-cap, the object being to provide a means of fitting said cap to the valve-seat when the walls of the valve-casing are disintegrated by the action of the water thereon, also to provide an easier mode of repairing said valve-seat when the trap is out of commission. Valve-cap 54 has formed thereon a lug 56, adapted to receive a pin 57, passing through a slot 58 in a connecting-link 59. Said connecting-link 59 connects valve-cap 54 and float-arm 42 and at its pivotal portion 60 in said float-arm 42 is provided with a series of adjusting-holes 61, the object of said adjusting-holes 61 being to provide a means of increasing and decreasing the stroke or leverage of the discharge means.

The operation of the device is as follows:

In Fig. 1 controlling-valve 33 in steam-inlet pipe 32 is opened, permitting steam to enter into casing 1 for condensation. The water as it accumulates in the trap will rise to about one-half of the trap's capacity before it discharges therefrom; but in case the water accumulates too fast and the discharge means will not permit the water to flow freely through said discharge means controlvalve in by-pass 31 is opened, thus assisting the discharging means and permitting a greater quantity of water to pass therefrom. If in case the discharging means does not discharge a quantity great enough to exhaust the trap in the required time, adjusting-disks 25 and 26 are regulated to permit of the greater movement of the dischargecontrolling means, permitting the rod 21 to have a greater horizontal movement.

The buffer-disks 28 and 29 are so constructed that they assist the direct force of water acting thereon and provide a means for the even discharge of water from the trap.

In Fig. 4 the discharge-controlling means is practically as above described, except that the said discharge means is a direct verticallyoperating discharge. The object of the said vertically-operating discharge is to provide a more compact device. It is obvious that the action of the water in the above-described trap will actuate the ball-float 41 and in turn open and close the valve-cap 53, and that the parts embodying my invention are so simple in their construction that the operation of the discharge-controlling means will act more freely with the action of the water contained therein, and that in repairing the respective parts thereof very little alteration is required.

It is further obvious that the forms of my invention illustrated herein may be widely varied from without departing from the spirit of my invention, and I do not restrict myself to the details shown.

What I claim, and desire to secure by Letters Patent of the United States, is—

1. An apparatus of the character described comprising a casing, steam-inlet means connected therewith, horizontally-moving discharge means interposed in said casing, means for automatically actuating said horizontallymoving discharge means, means for evenly controlling the discharge of water therefrom, and means for assisting the said automatically-controlled discharge means.

2. An apparatus of the character described comprising a casing, steam-inlet means connected therewith, horizontally-moving discharge means interposed in said casing, means for automatically actuating said horizontallymoving discharge means, means for evenly controlling the discharge of water therefrom, means for regulating said automatically-actuated discharge means, and means for assisting the said automatically-controlled discharge means.

3. An apparatus of the character described comprising a casing, steam-inlet means connected therewith, horizontally-moving discharge means interposed in said casing, means for automatically actuating said horizontally-moving discharge means, means for increasing the said automatically-controlled discharge means, means for evenly controlling the discharge of water therefrom and means for assisting the said automatically-controlled discharge means.

4. An apparatus of the character described comprising a casing, steam-inlet means connected therewith, horizontally-moving discharge means interposed in said casing, means for automatically actuating said horizontally-moving discharge means, means for decreasing the said automatically-controlled discharge means, means for evenly controlling the discharge of water therefrom, and means for assisting the said automatically-controlled discharge means.

5. An apparatus of the character described comprising a casing, steam-inlet means connected therewith, horizontally-moving discharge means interposed in said casing, means for automatically actuating said horizontally-moving discharge means, means for regulating the movement of the discharge means, means for evenly controlling the discharge of water therefrom, and means for assisting the said automatically-controlled discharge means.

6. An apparatus of the character described including a casing, steam-inlet means connected therewith, an automatically-controlled discharge-valve interposed in said casing, said automatically-controlled discharge means comprising a valve-rod, adjusting means mounted therein, buffer means adapted to operate in conjunction therewith, and an adjustable closing means mounted on said valve-rod.

7. An apparatus of the character described including a casing, steam-inlet means connected therewith, automatically-controlled discharge means interposed in said casing, said automatically-controlled discharge means comprising a valve-rod, discharge-assisting means mounted thereon, actuating means connected therewith, and means for regulating the throw of said actuating means.

8. A discharge-valve of the character described comprising a horizontally-actuated valve-rod, discharge-assisting means mounted thereon, closing means mounted on said valve-rod and means for regulating the throw of said horizontally-actuated valve-rod.

9. A discharge-valve of the character described comprising a horizontally-actuated valve-rod, discharge-assisting means mounted thereon, closing means mounted on said valve-rod, and means for increasing and decreasing the movement of said discharge means.

10. An apparatus of the character described comprising a casing, steam-inlet means connected therewith, vertically-operated discharge means mounted therein, sediment-collecting means, means for actuating said vertically-operated discharge means, and means for regulating the throw of said vertically-operated discharge means.

11. An apparatus of the character described comprising a casing, steam-inlet means connected therewith, vertically-operated discharge means mounted therein, sediment-collecting means, means for actuating said vertically-operated discharge means, and means for increasing and decreasing the discharge of said vertically-operated discharge means.

12. An apparatus of the character described including a casing, steam-inlet means connected therewith, automatically-controlled discharge means mounted in said casing, said automatically-controlled discharge means comprising a valve-casing, having formed thereon a valve-seat, a cap adapted to be seated in said valve-seat, adjusting means connected thereto, and means for actuating said valve-closing means.

13. An apparatus of the character described including a casing, steam-inlet means connected therewith, automatically-controlled discharge means interposed in said casing, said automatically-controlled discharge means comprising a valve-rod, a valve-head on said valve-rod, a seat for said valve-head, discharge-assisting means mounted on said valve-rod, actuating means connected therewith, and means for regulating the throw of said actuating means.

14. An apparatus of the character described including a casing, steam-inlet means connected therewith, automatically-controlled discharge means interposed in said casing said automatically-controlled discharge means comprising a valve-rod, a valve-head on said valve-rod, a seat for said valve-head, a discharge-assisting means comprising a valve-rod having mounted thereon means for forming a compression in a passageway, actuating means connected therewith and means for regulating the throw of said actuating means.

In testimony whereof I have hereunto signed my name in the presence of two subscribing witnesses.

JAMES J. HASSEN.

Witnesses:
 ROBT. W. ASHLEY,
 OLIN A. FOSTER.